(No Model.) 2 Sheets—Sheet 1.
O. A. HENSEL.
RAWHIDE TIRE AND PROCESS OF MAKING SAME.
No. 587,671. Patented Aug. 3, 1897.
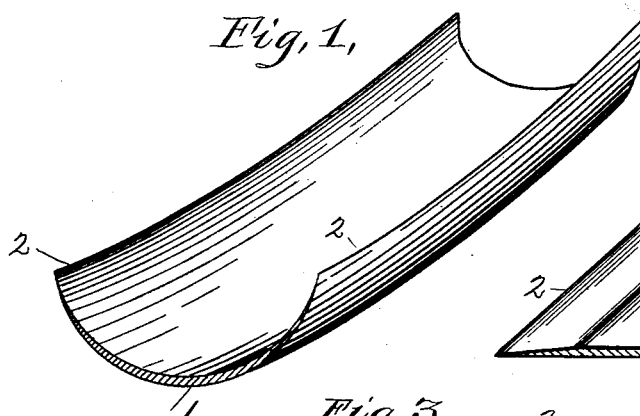
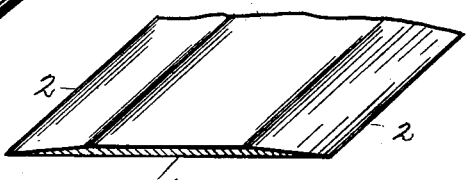
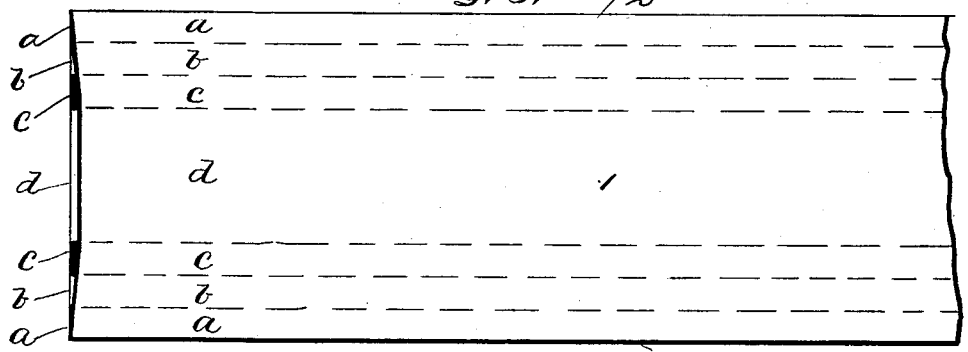
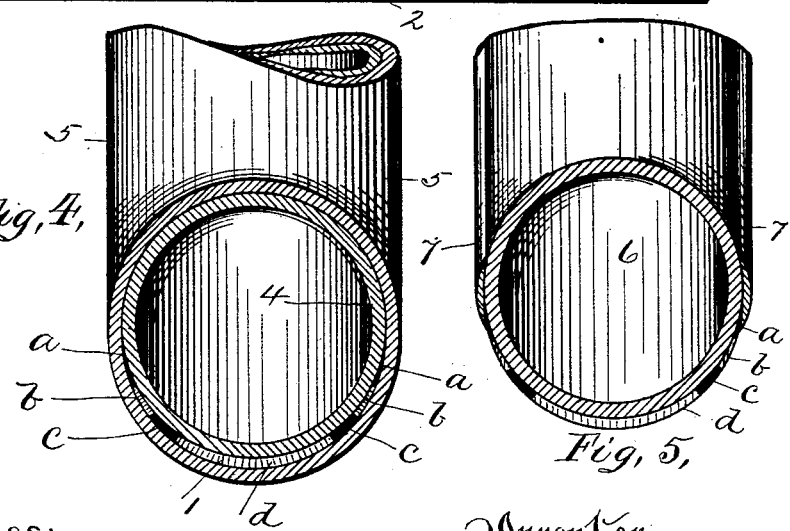

(No Model.) 2 Sheets—Sheet 2.
O. A. HENSEL.
RAWHIDE TIRE AND PROCESS OF MAKING SAME.
No. 587,671. Patented Aug. 3, 1897.
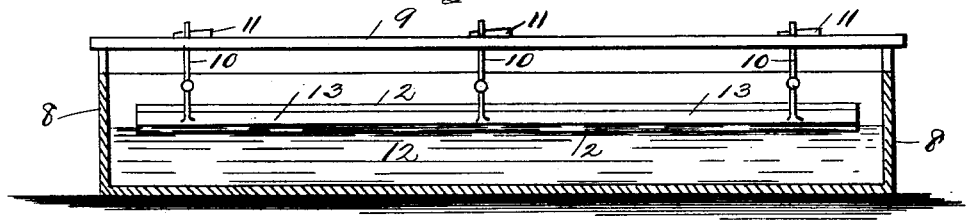
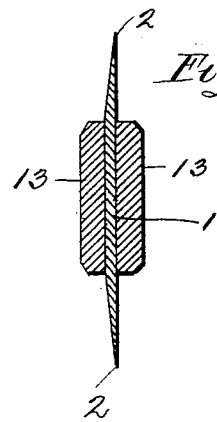
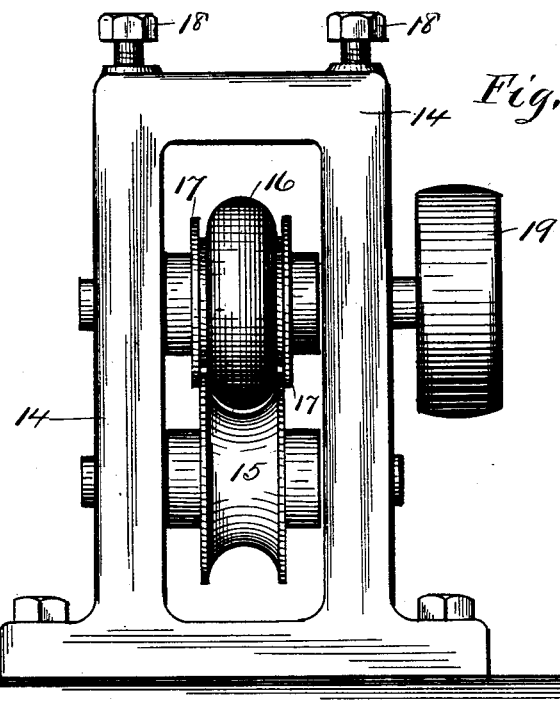
Witnesses:
Geo. W. Lavin
Wm. R. Rowe
Inventor;
Otto A. Hensel.
by his attorney.
H. E. Harrison.

UNITED STATES PATENT OFFICE.

OTTO A. HENSEL, OF PITTSBURG, PENNSYLVANIA.

RAWHIDE TIRE AND PROCESS OF MAKING SAME.

SPECIFICATION forming part of Letters Patent No. 587,671, dated August 3, 1897.

Application filed July 20, 1896. Serial No. 599,964. (No model.)

*To all whom it may concern:*

Be it known that I, OTTO A. HENSEL, a citizen of the United States, residing at Pittsburg, in the county of Allegheny and State of Pennsylvania, have invented certain new and useful Improvements in Tires and Processes of Making the Same, of which the following is a full, clear, and exact specification, reference being had to the accompanying drawings.

My invention relates to a new article of manufacture and the process of making the same; and the object is to provide a strip bent to a peculiar form to be inserted in or attached to a bicycle or other pneumatic tire for vehicles which will prevent puncture of the pneumatic tube and thereby fill a long-felt want in this class of vehicle-tires; and it consists in a strip of rawhide prepared and formed by the process hereinafter described, to be inserted or attached to the ordinary rubber tire in a manner that will prevent any injury to the said tire and at the same time maintain the flexibility, elasticity, and other well-known advantages of the "pneumatic tire" such as is now in common use on bicycles and other vehicles, together with the peculiar construction and arrangement and other details of the article, and also the particular process of manufacturing the same, as will be fully described hereinafter.

In the use of the pneumatic tire on bicycles and other vehicles the same must necessarily be formed from a soft flexible yielding rubber, in order that the same may give an elastic spongy cushion, which renders punctures frequent and often while the operator is riding over rough, uneven, or rocky roads. Therefore it is the object of my invention to provide such pneumatic wheels with a shield or armor that will effectually prevent any such punctures and at the same time maintain all the well-known advantages of this class of tires.

Another and principal object of my invention is to produce a substance for the purpose above set forth and to form the said shield or armor of a material that will not in any wise injure the tire either by cutting or shearing the rubber composing the same or by having oil, grease, or other fatty substance used in the composition of the same, as these substances are all detrimental to the life of the tire.

In the accompanying drawings, Figure 1 is a perspective view of a portion of my new article adapted to be arranged in connection with a bicycle or other pneumatic tire which is constructed in accordance with my invention. Fig. 2 is a perspective view of a portion of the strip before bending the same in the form of a semicircle to fit snugly and evenly about the tire. Fig. 3 is a face view of the strip formed from the hide, showing in dotted lines the different texture of the said strip, ranging from a soft flexible material at each edge to a hard springy non-puncturable substance at the center. Fig. 4 is a cross-section of a portion of a pneumatic tire consisting of an inner and outer tube, such as are now in common use, and provided intermediate of said tube and cover with my improved non-puncturable shield or armor. Fig. 5 is a similar view of a tire consisting of a single tube having my improved shield or armor attached to the outside of the same. Fig. 6 is a sectional side elevation of the tanning-vat, together with an apparatus for clamping and suspending the strips in the tanning liquid to tan the edges. Fig. 7 is an enlarged end elevation of the strip, showing the side clamps for suspending the same in the vat. Fig. 8 is a front elevation of the rolls for forming, pressing, and otherwise finishing the shield or armor and to give the same a hard smooth polished surface.

In order to construct a shield or armor for bicycle and other tires, I commence with a green hide and steep the same in a mixture of lime and water to remove the hair, then scrape to remove the flesh, and then immerse in a mineral salt—such as alum, saltpeter, rock-salt, &c.—in a manner well known in the art, and, finally, washing in clear water, stretching the hide, and drying the same. The hide thus prepared is now ready to cut into strips of suitable widths for the purpose intended. The strips are now pressed or rolled by suitable apparatus to give the same a uniform thickness, and then by means of a splitting-machine two or more strips are formed by dividing the same longitudinally in the direction of its length, thereby making the strips very thin and of a uniform thickness. The "grain" side of the leather will be used for first-class tires and the inner strips for second and third class, as the grain portion of the hide is considered and is, in fact, known to be the best. The strips are now beveled from the center toward each edge, as will be seen by reference to Figs. 2 and 7. This may be accomplished by means of any of the well-known machines used for that purpose, thereby leaving a comparatively thick central portion 1 and thin knife-like edges 2 at either side. The strip is now taken and attached in a frame 10, capable of being elevated from or lowered into a tanning-vat 8, by means of wedges 11 or other suitable devices, in order that but a certain portion of the strip may be immersed into the tanning liquor 12. This frame is provided with clamps 13, which partially inclose the strip in the direction of its length, as will be seen by reference to Figs. 6 and 7 of the drawings. By thus immersing the edge 2 of the strip 1 in the tanning liquor the portion immersed will be completely tanned and converted into a soft flexible leather, while those portions immediately above will be about one-half to one-quarter tanned, as will be seen by reference to Fig. 3 on the drawings, in which the portion $a$ on the outer edges represents that portion which is completely tanned, while the portion marked $b$ is about one-half tanned by the absorption of the liquor, and the portion $c$ represents about one-fourth tanned, and the remaining central portion $d$ being rawhide.

When one edge of the strip has been tanned and cured in accordance with the above method, the strip is removed from the clamps 13 and reversed, so that the other edge 2 may be treated likewise. After drying the strips the same are given a bath composed of a solution of bichromate of potassa, diluted with water in the proper proportions to reduce the same to a liquid state. This bath acts as a mordant to fix or set the fiber of the rawhide and tanned portion of the same, thereby making the strip soft and flexible, also waterproof. The strips thus prepared are now thoroughly dried, and rolled, hardened, and formed into shape by the use of an apparatus such as shown at Fig. 8 on the drawings, said apparatus consisting of a housing 14, provided with two rolls suitably journaled therein, and having a means, such as screws 18, to place a pressure upon the top roll. This top roll consists of a disk 16, having a semicircular bead or projection about its periphery, adapted to operate within a groove 15 about the periphery of the lower roll, and a suitable shroud 17 to prevent side movement of either of said rolls 15 or 16. A pulley 19, attached to one of the rolls, serves as a means of turning or revolving the rolls, the one being operated by the frictional contact of the strip passing through the same. By means of this device last described the strips prepared and dried after tanning the edges are bent, formed, and polished by first heating the rolls 15 and 16 to about 150° Fahrenheit and then passing the strip through the rolls while the same are in rapid rotation. After several times passing the strips through the rolls in the manner described the same is given a thin coat of wax or other resinous substance and again passed once or twice through the rolls to complete the polish of the finished article and bend the strip in a semicircle in cross-section. The strips are now ready to be fitted and adjusted to tires of the wheels of the bicycles, &c. The meeting edges in forming the circle of the shield or armor are tapering or beveled to permit the one to overlap the other without increasing the thickness and without joining the one end with the other, which will permit the shield or armor to adjust itself to any slight difference in the diameter of the wheels. To insert or attach one of these shields or armors to a bicycle-wheel having an inner pneumatic tube 4 (see Fig. 4) and an outer covering 5, I place the same intermediate of the two and upon the tread of the wheel, but upon a wheel having a single tube 6 (see Fig. 5) I amalgamate or join the rubber by strips 7 to the soft or tanned edges $a\ a$ and to the sides of the tube 6. By thus preparing the edges $a$ by tanning the same will not present any hard sharp edge to chafe or cut the rubber forming the tire, while the rawhide center $d$ will resist and prevent puncture of the inner tube 4 while the rider is going over broken glass, rocks, nails, &c., and at the same time not reduce or mar the flexibility and elasticity of the tire.

Having thus described my invention, I claim—

1. A new article of manufacture, consisting of a rawhide strip, having thin tapering, tanned edges, bent in the form of a semicircle in cross-section, and provided with tapering ends, whereby a portion of one end may overlap the other, without increasing the thickness when the strip is bent in the form of a circle, as described.

2. The herein-described method of manufacturing shields or armors for pneumatic tires, consisting of beveling a strip of rawhide, tanning a portion of each edge thereof and rolling the same in the form of a semicircle in cross-section, by means of heated rolls, then polishing by means of a wax coating and again passing the strip through the rolls, substantially as described.

3. In combination with a pneumatic tire for bicycles and other tires, a rawhide strip tanned at each edge arranged over the tread of the said tire, and attached thereto by means of rubber strips joining the tanned edges of the strip with the rubber sides of the tire, substantially as described.

In testimony that I claim the foregoing I hereunto affix my signature this 18th day of July, A. D. 1896.

OTTO A. HENSEL. [L. S.]

Witnesses:
 GEO. W. LOWEN,
 WM. R. ROWE.